(No Model.) 2 Sheets—Sheet 1.

A. EPERTS & H. PERK.
GRATER.

No. 331,874. Patented Dec. 8, 1885.

Attest:
L. M. Hopkins
Geo. L. Wheelock

Inventors:
August Eperts
Herman Perk
By Knight Bros
Att'ys (No Model.) 2 Sheets—Sheet 2.

A. EPERTS & H. PERK.
GRATER.

No. 331,874. Patented Dec. 8, 1885.

UNITED STATES PATENT OFFICE.

AUGUST EPERTS AND HERMAN PERK, OF ST. LOUIS, MISSOURI.

GRATER.

SPECIFICATION forming part of Letters Patent No. 331,874, dated December 8, 1885.

Application filed March 30, 1885. Serial No. 160,623. (No model.)

*To all whom it may concern:*

Be it known that we, AUGUST EPERTS and HERMAN PERK, both of the city of St. Louis, in the State of Missouri, have invented a certain new and useful Improvement in Graters, of which the following is a full, clear, and exact description, reference being had to the accompanying drawings, forming part of this specification, and in which—

Figure 1:
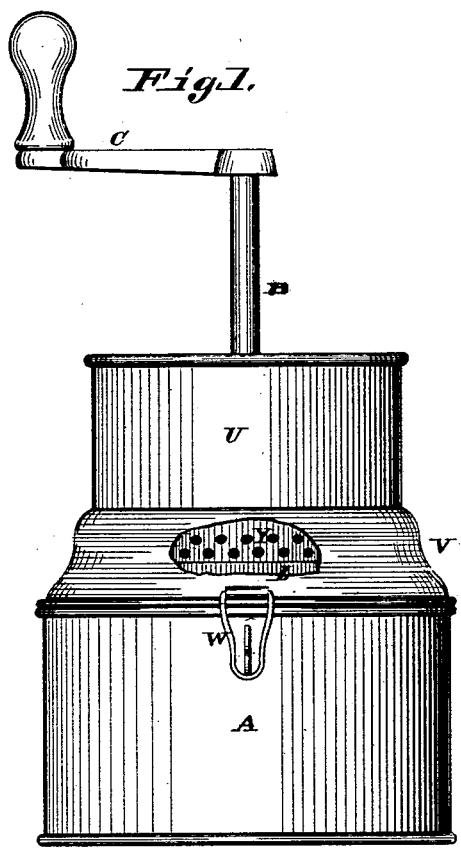
Figure 2:
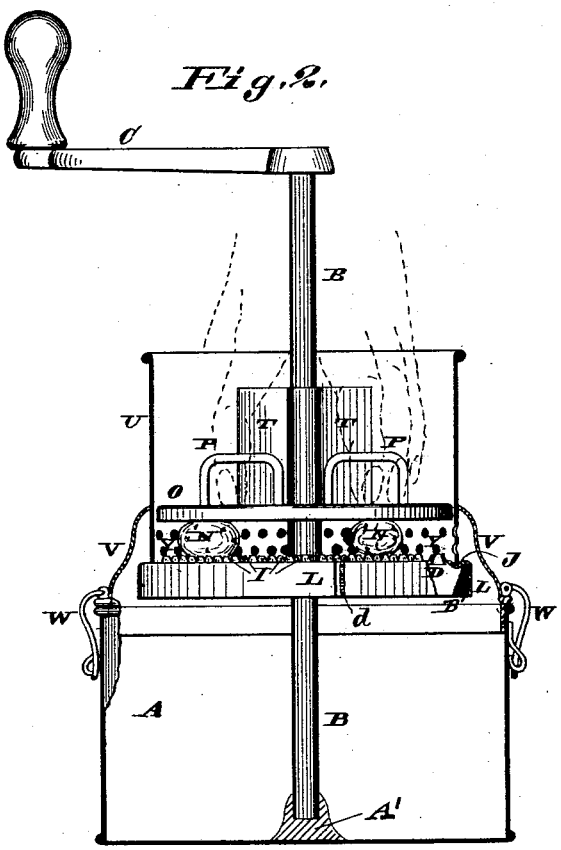
Figure 3:
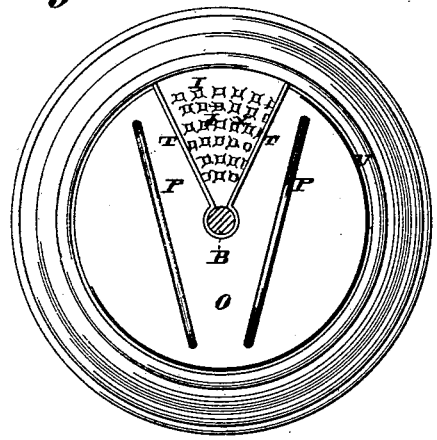
Figure 4:
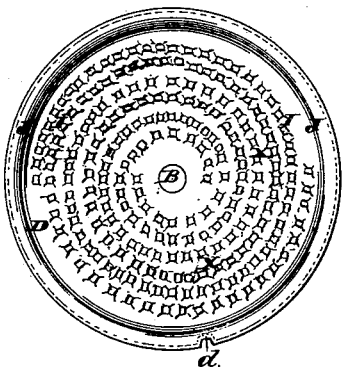
Figure 5:
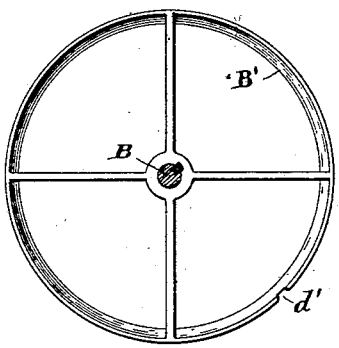

Figure 1 is a side elevation of our improved grater. Fig. 2 is partly broken away and partly a vertical section with the feed-plate in elevation. Fig. 3 is a top view with the shaft in section. Fig. 4 is a top view of the grating-plate removed. Fig. 5 is a top view of the wheel which supports the grating disk or plate.

Our invention relates to an improved form of grater, intended more particularly for grating potatoes, horse-radish, and the like; and our invention consists in the features of novelty hereinafter fully described, and pointed out in the claims.

Referring to the drawings, A represents a vessel, in the bottom of which is a step, A', for a vertical shaft, B, provided at its upper end with a crank, C, and to this shaft is secured the supporting-wheel B', carrying a grating disk or plate, D, having upwardly-extending teeth or projections I, a circumferential groove, J, outside the teeth, and a downwardly-extending flange, L. As the shaft is turned, the plate D is carried around with it, the teeth acting to cut and scrape the articles N, which are held down upon them by a feed-plate, O, against which the fingers are pressed, as shown in Fig. 2, and which may be provided with wires P, by which it can be lifted out. It is cut away to fit a V-shaped frame, T, that surrounds the shaft and keeps the plate from turning. The frame is secured to a cylinder, U, within which the feed-plate fits, as shown. From the cylinder U projects a collar or flange, V, that fits the vessel A, and is secured thereto by catches W.

The teeth or projections of the grating-plate are formed in a single or double row of spiral series, as shown in Fig. 4, for the purpose of making the plate self-cleaning, for the material that does not fall through the perforations of the teeth will be moved around in the channels X between the rows of teeth until it reaches the periphery of the disk, from where it will be discharged into the vessel A through holes or perforations Y in the lower end of the cylinder U. This portion of the material is prevented from working out under the cylinder by the lower edge of the cylinder fitting in the groove J of the disk or plate D.

The grating disk or plate D is made removable from its supporting-wheel B', which wheel is fast upon the shaft B. This feature of construction is quite important, as the teeth I are liable to become worn by use, and in this case the disk D is removed and another put in its place. This change may be made with ease and the additional disks may be furnished at very little cost, as they may be stamped out with the proper dies at a single operation.

The periphery of the wheel B' has a recess or notch, d', (see Fig. 5,) and the flange of the disk has a set-in, forming a rib, d, (see Figs. 2 and 4,) which occupies the notch or recess to prevent the wheel turning within the disk, and compel the latter to turn with the wheel.

We claim as our invention—

1. The combination of vessel A, cylinder U, with flange or collar V, shaft B, feed-plate O, and disk or plate D, having scraping teeth or projections I and groove J, arranged and operating substantially as and for the purpose set forth.

2. The combination of vessel A, cylinder U, having perforations Y, shaft B, and disk or plate D, having scraping teeth or projections arranged or formed in spiral series, substantially as and for the purpose set forth.

3. The combination of vessel A, cylinder U, having flange or collar V and perforations Y, shaft B, feed-plate O, with wires P, V-shaped frame T, and disk D, having flange L, teeth or projections I, formed in spiral series, and groove J, all arranged and operating substantially as and for the purpose set forth.

AUGUST EPERTS.
HERMAN PERK.

Witnesses:
SAML. KNIGHT,
BENJ. A. KNIGHT.